(12) United States Patent
Douglas et al.

(10) Patent No.: US 7,695,201 B2
(45) Date of Patent: Apr. 13, 2010

(54) ONE STEP FIBER END-FACE POLISHING PROCESS

(75) Inventors: David Douglas, Port Jefferson Station, NY (US); Serge Steinblatt, Raanana (IL); Daniel Hachnochi, Tel-Aviv (IL); Stela Diamant-Lazarovich, Herzelia Pituah (IL)

(73) Assignee: Sagitta Engineering Solutions Ltd (IL)

( * ) Notice: Subject to any disclaimer, the term of this patent is extended or adjusted under 35 U.S.C. 154(b) by 441 days.

(21) Appl. No.: 11/817,197

(22) PCT Filed: Feb. 5, 2006

(86) PCT No.: PCT/IL2006/000137

§ 371 (c)(1),
(2), (4) Date: Aug. 27, 2007

(87) PCT Pub. No.: WO2006/090358

PCT Pub. Date: Aug. 31, 2006

(65) Prior Publication Data
US 2008/0210362 A1 Sep. 4, 2008

(30) Foreign Application Priority Data
Feb. 27, 2005 (IL) ................................ 167116

(51) Int. Cl.
*G02B 6/26* (2006.01)
*B23K 26/00* (2006.01)

(52) U.S. Cl. .................... 385/85; 385/78; 156/153; 156/267; 156/272.8; 156/293; 219/121.69; 451/28

(58) Field of Classification Search .................. 385/38, 385/77, 78, 79, 80, 85, 135, 147; 219/121.1, 219/121.61, 121.62, 121.65, 121.67, 121.69; 156/153, 267, 272.8, 293; 451/28
See application file for complete search history.

(56) References Cited

U.S. PATENT DOCUMENTS

| 4,510,005 A * | 4/1985 | Nijman ................. 156/221 |
| 5,421,928 A | 6/1995 | Knecht et al. ............. 156/153 |
| 5,601,474 A * | 2/1997 | Takahashi ............... 451/28 |
| 5,966,485 A | 10/1999 | Luther et al. .............. 385/85 |
| 6,106,368 A * | 8/2000 | Childers et al. ........... 451/28 |
| 2003/0235374 A1 | 12/2003 | Luther et al. .............. 385/85 |
| 2008/0210362 A1 * | 9/2008 | Douglass et al. ........... 156/153 |

* cited by examiner

*Primary Examiner*—Brian M Healy
(74) *Attorney, Agent, or Firm*—Smith Frohwein Tempel Greenlee Blaha, LLC; Gregory Scott Smith

(57) ABSTRACT

Disclosed is a one step fiber optic connector polishing method. The method is a sequence of processes that may include severing a fiber (100) length projecting out of the end face (106) of a ferrule (102) having a pre-shaped surface, such that the residual fiber length does not exceed 80 microns. Cleaning ferrule (102) end face (106) such that no residual debris are left on it. Polishing fiber end-face (140) only, on a finishing polishing film (180) until fiber end-face (140) and ferrule end-face (106) are in a relation that ensures the desired fiber undercut or protrusion.

15 Claims, 4 Drawing Sheets

ONE STEP FIBER END-FACE POLISHING PROCESS

CROSS-REFERENCE TO RELATED APPLICATIONS

This application is filed under 37 U.S.C. 371 and is based on International Patent Number PCT/IL2006/000137 entitled "ONE STEP FIBER END-FACE POLISHING PROCESS" which was filed on Feb. 5, 2006, which application claims the benefit of the filing date and priority of Israeli Application for Patent having been assigned the serial number of 167116 and filed on Feb. 27, 2005 naming David Douglas, Serge Steinblatt, Daniel Hachnochi and Stela Diamant-Lazarovich as the inventors, which application is herein incorporated by reference.

TECHNICAL FIELD

The present method is most applicable in the manufacture of fiber optic terminations, specifically, the downstream process, which encompasses fiber cleaving and polishing.

BACKGROUND

As optical communication networks continue to grow to support the never-ending need for bandwidth (internet, cable TV, telephony services, etc.), optical connections, which allow safe, reliable and easily configurable terminations of these systems, sub-systems, and devices, will grow as well. Optical connectors, which come in a variety of single-fiber and multi-fiber configurations typically consist of a doped silica optical fiber, a ceramic or plastic ferrule, cable interfacing crimps, a spring-loaded inner body, and an intermateable outer housing. The manufacturing process of optical connectors typically consists of 8-15 steps generalized as: Fiber and Cable Preparation, Epoxy and Cure, Cleave and Denub, Epoxy Removal, Polish, and others.

U.S. Pat. Nos. 5,421,928, 5,480,344 and 6,632,026 disclose some of the listed above steps related to the manufacture of optical connectors.

Arguably, the most performance-critical step in the manufacture of optical connectors lies in the geometry formation process (Cleaving through Polish). These steps greatly influence the fiber's physical contact between adjoining optical connectors and ultimately determine a connector's ability to transmit (optical signal power coupling loss) and reflect the transmission signal.

Polishing is a multi step process where the end-face of the ferrule and the fiber are gradually worked and reshaped using different grade polishing materials until the desired radius, angle, flatness and surface quality (roughness) is achieved. The number of polishing steps is connector dependent, ranging from 3 or 4 steps for simplex connectors, to 5 or 6 steps in multi-fiber connectors. Unfortunately, in today's optical connector manufacturing environment, there are no industry standards and conventional processing protocols (6-sigma, SPC, etc.) are rarely deployed. Many of the manufacturing processes are inherently unstable due to variabilities in operators and training and manufacturing tools. Furthermore, the consumable costs associated with polishing can contribute as much as 15% to the overall manufacturing costs.

In an effort to reduce manufacturing cycle time, reduce manufacturing complexity, and, ultimately remove manufacturing costs while improving the performance of optical connectors, it is highly desirable to consolidate process steps, where possible, and reduce the number of steps required for polishing a connector.

BRIEF LIST OF DRAWINGS

The disclosure is provided by way of non-limiting examples only, with reference to the accompanying drawings, wherein.

DETAILED DESCRIPTION

Figure 1:
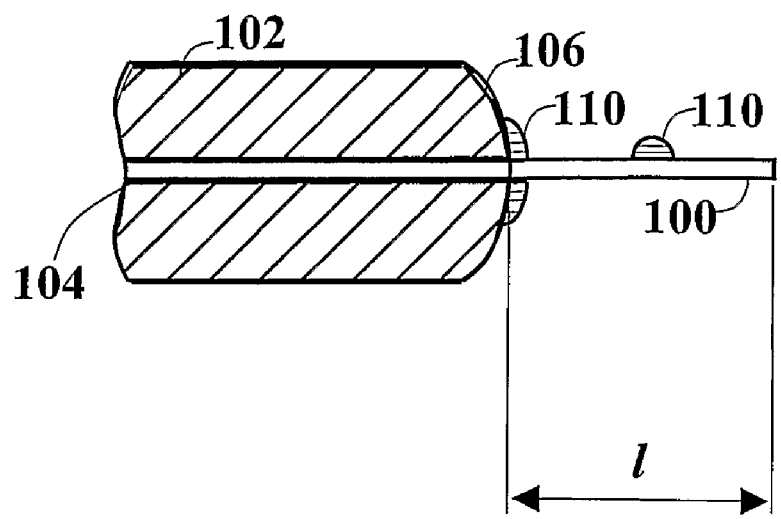
FIG. 1 is a schematic illustration showing a ferrule and a fiber projecting out of the ferrule.

The principles and execution of the method described thereby may be understood with reference to the drawings, wherein like reference numerals denote like elements through the several views and the accompanying description of non-limiting, exemplary embodiments.

The term "ferrule," as used in the text of the disclosure, means an optical connector with a polished end-face of which comprises a fiber inserted into a ferrule. The term "ferrule" encompasses fiber stubs, simplex fiber connectors, duplex fiber connectors, and multiple fiber connectors (MTP). A ferrule can be made of ceramic, plastic, metal, glass or composite material. "Ferrule end-face" is defined as the spherical surface or planar surface that is tangent to the ferrule at the point where the fiber emerges from the ferrule. It may be flat, angled or shaped by a radius. "Fiber end-face" is the tip of the fiber that in absence of protrusion coincides with the ferrule end-face. "Protrusion" and "undercut" are parameters that define the length of the fiber projecting over or being below the ferrule end-face.

In a generalized depiction of the optical connector manufacturing process, as shown in FIG. 1, optical fiber 100 is inserted into a connector ferrule 102 and secured to it by adhesive 104. Ferrule 102 may have a flat, angled, or pre-radiused end-face 106, dependent on the specification of the particular connector. Ferrule can accommodate one (simplex), two (duplex) or multiple (MT) fibers. There is rough control over the length l of the fiber projecting out of a ferrule. The length l (before cleaving) is usually between 4-20 mm. In many cases the adhesive, which is typically epoxy, spills out of the ferrule forming so called epoxy beads 110. The protruding fiber and epoxy bead must be removed prior to the polishing sequence.

Figure 2:
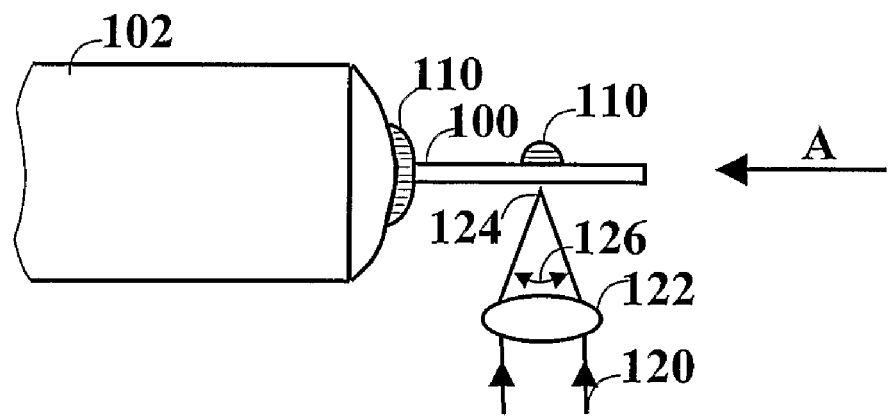
FIG. 2 is a schematic illustration of the method of severing a fiber length projecting out of the end face of a ferrule.
Figure 3:
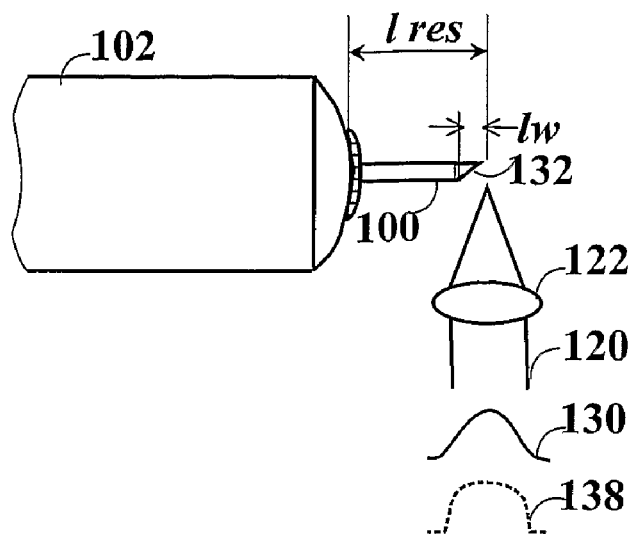
FIG. 3 is a schematic illustration of the wedge formed on the tip of the fiber as a result of severing a fiber length.

Reference now is made to FIG. 2, which is a schematic illustration of the process of severing a fiber length projecting out of the end face 106 of ferrule 102. A laser beam 120 focused by lens 122 into a spot 124 having sufficient energy to ablate the fiber 100 and epoxy material. The residual epoxy material is ablated to a sufficient level, relative to the ferrule end face, that can be readily removed by a minimal polishing process. Because of aperture angle 126 of fiber severing laser beam 120 and of the Gaussian energy distribution 130 (FIG. 3) of the beam, the cut of fiber 100 may have a wedge 132 type form (FIG. 3).

Figure 4:
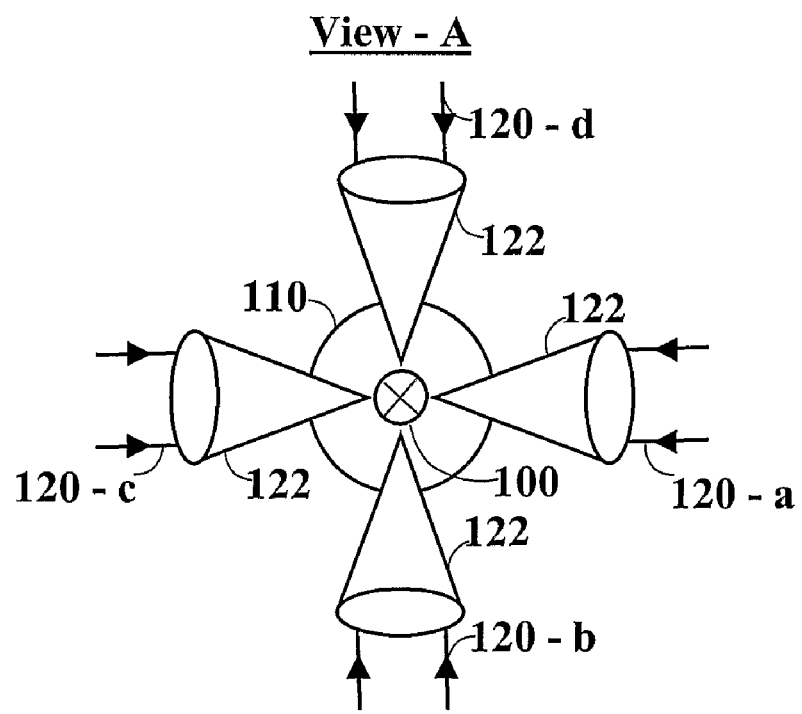
FIG. 4 is a schematic illustration of the method of severing a fiber length projecting out of the end face of a ferrule from a plurality of angular locations.

Use of a laser as a tool enables selective removal of parts of fiber 100 and machining of the remaining parts of the fiber. For example by scanning the focused laser beam around the circumference of fiber 100 or changing the energy distribution to other than Gaussian distribution 138 (FIG. 3) it is possible to avoid formation of a wedge 132, or at least significantly decrease the size of the wedge at severed tip of fiber 100. Scanning may be performed with continuously operating laser beam 120. Otherwise, laser beam 120, as shown in FIG. 4, may be intermittently switched-off and activated at selected angular locations 120-*a* through 120-*d*. Alternatively, fiber 100 may rotate and laser beam 120 be stationary. Severing of MTP connectors is performed by scanning the laser beam along the connector, as disclosed in Patent Convention Treaty application PCT/IL2005/000960 to the same assignee.

The continuous relative movement between severing laser beam 120 and fiber 100 may generate a conical or "spherical" end-face having height 128 of less than 40 microns. Intermittent switching OFF and ON of laser beam 120 (FIG. 4) at selected angular locations may result in a pyramidal profile having a height similar to height 128. Thus, by severing and machining fiber 100 from a plurality of directions it is possible to provide a desired shape to end-face 140 (FIG. 5) of fiber 100. Another benefit of severing fiber 100 from a plurality of angular locations or directions is the uniform removal of epoxy beads 110 from the ferrule end-face 106 including epoxy beads that were present on fiber 100. In some cases, a residual layer of up to 40 microns may be left. The laser severed and pre-shaped fiber surface has a roughness comparable with that produced by the interim steps of a multi step polishing processes. Such fiber may be polished to Telcordia standards in a single step, with minimal reshaping of the ferrule in which it is mounted. For select MTP applications requiring the coupling of 4 or more fibers, the laser-severed fibers may be suitable for certain optical transmissions with little or no subsequent polishing required. In such applications, consumable and labor costs, as well as expensive flocking polishing paper, can be eliminated.

Figure 6:
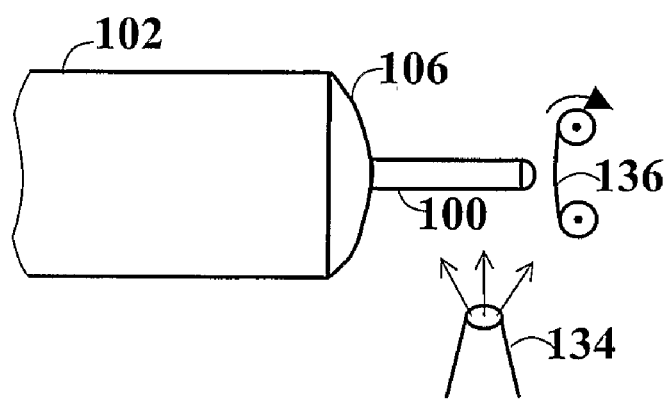
FIG. 6 is a schematic illustration of the method of severed fiber and ferrule end-face cleaning.

Cleaning of the ferrule end-face, as shown in FIG. 6, may remove fiber debris and epoxy residue on the ferrule end face 106 or on fiber 100 generated by the epoxy and fiber removal process. Removal of debris from ferrule end face enables proper contact between making optical connection adjoining ferrules. For cleaning, a sprayer 134 may spray a detergent or other cleaning type solution and the end-face may be wiped by a wiping material 136. Wiping of the ferrule end-face may remove fiber debris if the laser-severing beam did not separate them. Alternatively, a stream of clean air may be used to remove the debris and dry the detergent. Larger fiber protrusion values and thicker residual epoxy layers characterize multi fiber connectors (MPT). In some cases, where cleaning has not removed residual epoxy layer a two step polishing process may be required. Alternatively, it is possible to minimize the amount of epoxy that spills out on the ferrule end face 106, thus saving additional labor and expense in the upstream epoxy application process.

Laser beam 120 may have a wavelength well absorbed by the fiber 100 material. A $CO_2$ laser may be such a laser, although lasers emitting laser beams at other wavelengths less absorbed by the fiber material can be used. In case the laser (not shown) emits a non-visible laser beam, it may optionally have a built-in pointing laser that provides a laser beam of a visible wavelength. The beam of the pointing laser may be aligned coaxially with the $CO_2$ laser beam.

Figure 5:
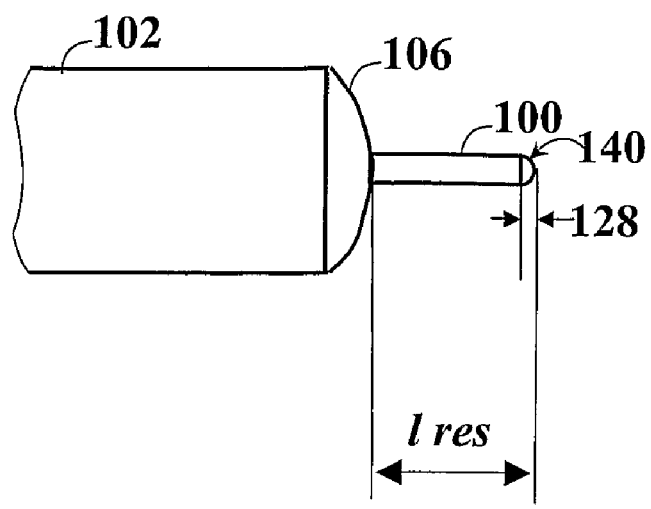
FIG. 5 is a schematic illustration of the severed fiber (stringer) end-face parameters.

Fiber cutting may be performed in such a way that it leaves a relatively short residual fiber length called fiber stringer $l_{res}$ projecting from the ferrule end-face (FIG. 5). Length $l_{res}$ may be not more than 80 microns for simplex and duplex connectors and less than 200 microns for multiple fiber connectors (MTP). Residual length $l_{res}$ (stringer) of fiber 100 is selected to minimize the subsequent polishing time. Since MTP connectors are characterized by essentially larger residual fiber length, laser beam orientation may be selected such that it will leave a cut almost perpendicular to the fiber and no fiber end face shaping will be required.

Figure 7:
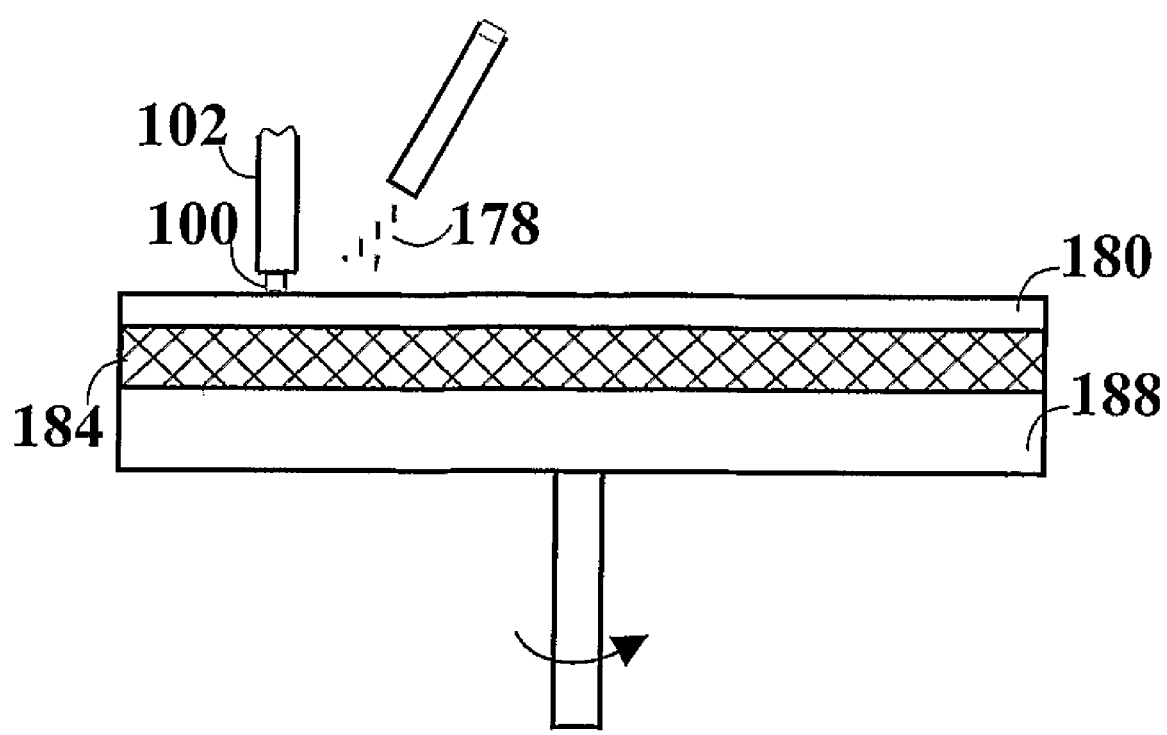
FIG. 7 is a schematic illustration of the method of one step polishing of a severed end-face of a ferrule with a fiber.

The severed and pre-shaped and cleaned optical fiber connector/ferrule may be polished in a one step polishing process on a silicon oxide finishing polishing film 180 (FIG. 7), such as Mipox final finish fiber optic Silicon Dioxide film SO-5X or similar. It is commercially available from Mipox International Corporation Ltd., Tokyo, Japan and has abrading particle sizes of about 0.26 microns. Polishing film 180 is selected to ensure proper removal rate of fiber 100. A typical fiber removal rate would be faster than 0.45 micron/sec. Polishing takes place in the presence of a coolant and lubricant, for example, de-ionized water 178 that does not require the chemical processing of fiber 100. In order to reduce the polishing effect on the ferrule having a predefined radius, the film is disposed over a resilient backing 184 having Durometer hardness of up to 90 Shore and the polishing process is discontinued when fiber 100 end-face 140 and ferrule end-face 106 are in a relation that ensures the desired fiber protrusion. Established values of protrusion are about 100 nm. For non pre-shaped, flat or angled (MTP) ferrule end-faces, a non-resilient backing may be used. Established protrusion values for such end-faces may be up to 20 micron. Other process parameters are polishing disk 188 diameter ranges from 125 mm to 350 mm and polishing disk rotational speed may be between 100 rpm and 300 rpm. Polishing is not limited to rotating disks. Polishing may be accomplished on a static film by moving the ferrule above the film.

The method of removing excessive epoxy 110 and severing fiber length projecting out of the ferrule end-face 106 coupled with fiber end-face 140 pre-shaping, enables one-step fiber 100 polishing utilizing finishing polishing film 180. In a large majority of cases, the fiber polishing process is discontinued when fiber end-face 140 becomes flush with ferrule end-face 106 or a desired protrusion is achieved. Practically, fiber 100 polishing is discontinued before ferrule 102 end face 106 touches polishing paper 180.

The disclosed polishing method reduces the time required for optical fiber connector polishing, does not require use of expensive flocking polishing paper and accordingly reduces the number of polishing steps, the process complexity and, therefore, manufacturing cost.

While the exemplary embodiment of the present method has been illustrated and described, it will be appreciated that various changes can be made therein without affecting the spirit and scope of the method. The scope of the method, therefore, is defined by reference to the following claims.

The invention claimed is:

1. A one step fiber optic connector (ferrule) (102) polishing method, said method comprising: a. severing a fiber (100) length projecting out of the end face (106) of a ferrule (102) said ferrule (102) having a pre-shaped end face (106), such that the residual fiber length (stringer) does not exceed 80 microns; b. ablating the residual epoxy bead (110) to a sufficient level, relative to the ferrule end face (106), that can be readily removed by a minimal polishing process; c. polishing said fiber end-face (140) on a finishing polishing film (180); d. discontinuing said polishing process when said fiber end-face (106) are in a relation that ensures the desired fiber protrusion.

2. The method of claim 1 further comprising ferrule end-face (106) cleaning.

3. The method of claim 1, wherein said ferrule (102) is one of ceramic, plastic, metal, glass or composite material.

4. The method of claim 1 wherein said ferrule (102) is one of a group of having pre-shaped, flat or angled end-face.

5. The method of claim 1, wherein said ferrule (102) can accommodate one (simplex), two (duplex) or multiple (MT) fibers.

6. The method of claim 1, wherein said fiber (100) serving by a laser beam (120) removes epoxy beads (110) from said ferrule end-face (106) leaving a residual epoxy layer not exceeding 40 microns.

7. The method of claim 1, wherein said fiber (100) is severed by a laser beam (120) scanned around the fiber (100) circumference.

8. The method of claim 1, wherein said fiber (100) is severed by a laser beam (120) in selected angular locations disposed around the fiber (100) circumference.

9. The method of claim 1, wherein relative movement between a laser beam (120) and said fiber (100) is provided by a scanning laser beam (120).

10. The method of claim 1, wherein relative movement between a laser beam (120) and said fiber (100) is provided by ferrule rotation.

11. The method of claim 1, wherein said finishing polishing film (180) is disposed over a resilient backing (184) having a hardness of less than 90 Shore.

12. The method of claim 1, wherein said finishing polishing film (180) is disposed over a non-resilient backing.

13. The method of claim 1, wherein said desired fiber (100) protrusion is about 100 nm.

14. A one step fiber optics connector polishing method, said method comprising: a. severing a fiber (100) length projecting out of the end face (106) of a ferrule (102) having a pre-shaped surface and removing epoxy beads (110), such that the residual fiber length does not exceed 80 micron and residual epoxy bead thickness does not exceed 40 microns; b. polishing said fiber end-face (140) on a finishing polishing film (180) the film is selected to ensure that the removal rate of the fiber (100) is better than 0.45 micron/second; c. discontinuing said polishing process when said fiber end-face (140) and said ferrule end-face (106) are in a relation that ensures the fiber protrusion of about 100 nm.

15. A one step fiber optics connector polishing method, comprising: a. severing a fiber (100) length projecting out of the end face (106) of a ferrule (102) having an angled surface and removing epoxy beads (110), such that the residual fiber length does not exceed 200 micron and residual epoxy bead (110) thickness is shorter than the fiber length (after cleave); b. polishing said fiber end-face (140) on a finishing polishing film (180) is selected to ensure that the removal rate of the fiber (100) is better than 0.45 micron/second; c. discontinuing said polishing process when said fiber end-face (140) and said ferrule end face (106) are in a relation that ensures the fiber protrusion of up to 15 microns.

* * * * *